Figure 1:
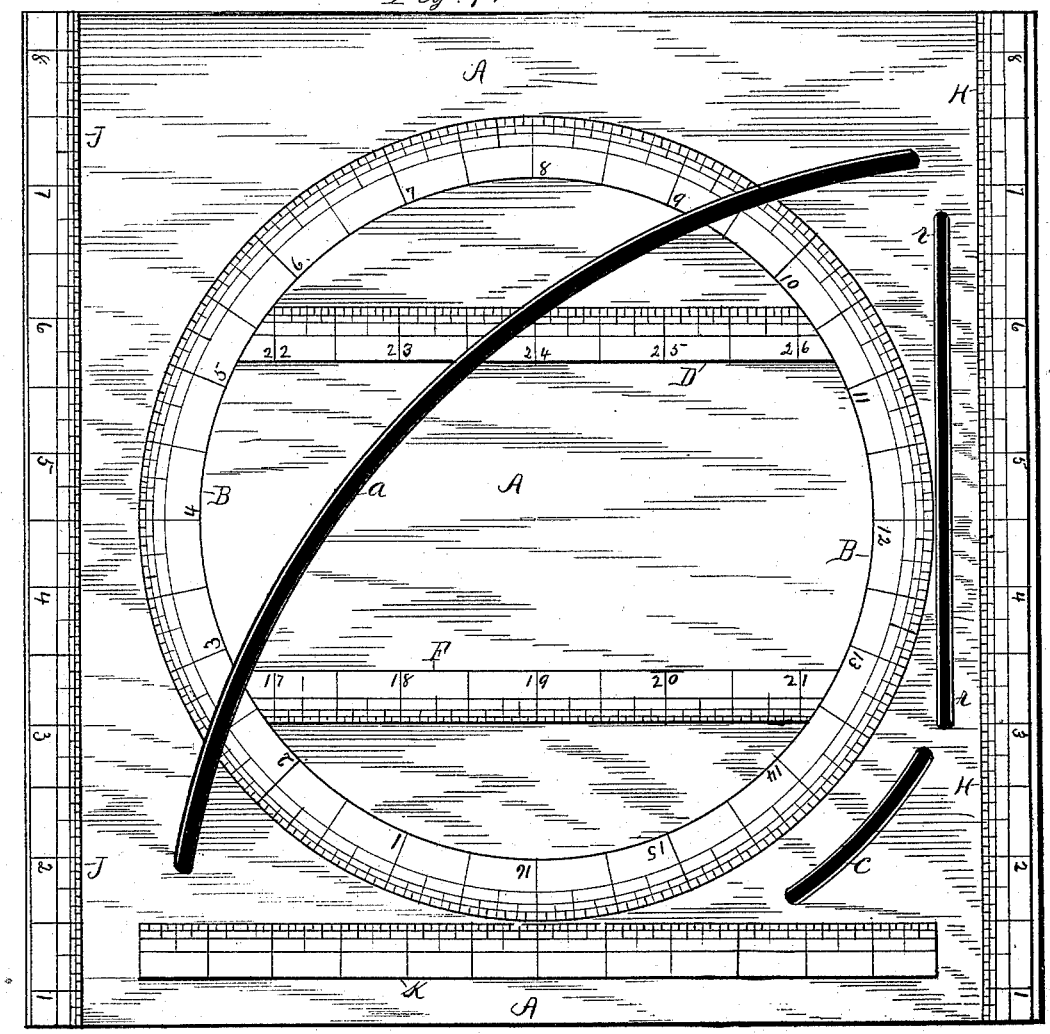

(No Model.) 2 Sheets—Sheet 1.

C. A. & L. K. WILLIAMS.
A. W. McALLISTER, Administrator of L. K. WILLIAMS, Deceased.
PATTERN TABLE FOR SHEET METAL SHEARING MACHINES.

No. 488,344. Patented Dec. 20, 1892.

Witnesses
P. A. Malberg
K. C. Hutchins

Inventors
Charles A. Williams
Levi K. Williams By
Thos. H Hutchins their atty (No Model.) 2 Sheets—Sheet 2.
C. A. & L. K. WILLIAMS.
A. W. McALLISTER, Administrator of L. K. WILLIAMS, Deceased.
PATTERN TABLE FOR SHEET METAL SHEARING MACHINES.
No. 488,344. Patented Dec. 20, 1892.
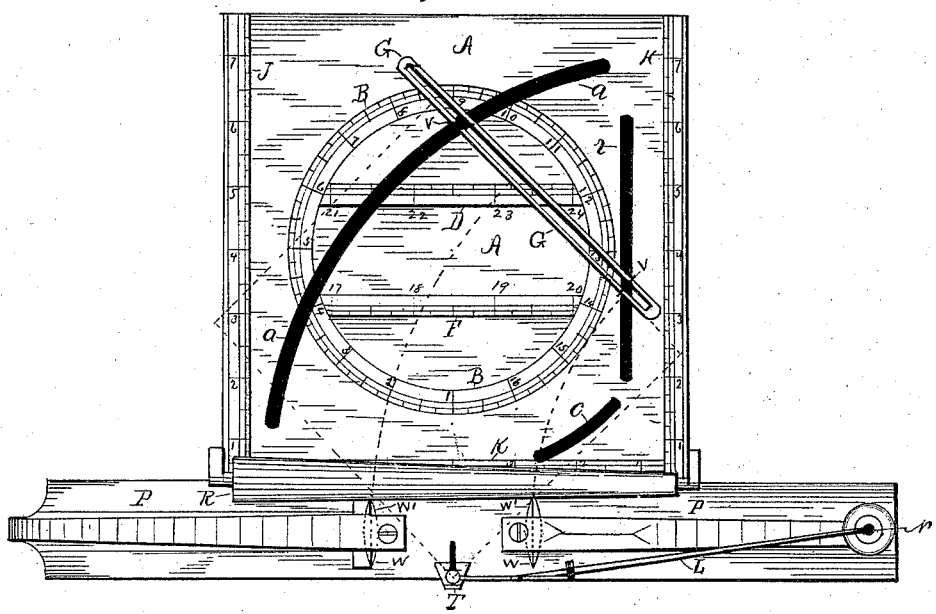
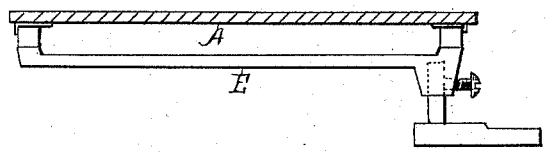

UNITED STATES PATENT OFFICE.

CHARLES A. WILLIAMS AND LEVI K. WILLIAMS, OF CHICAGO, ILLINOIS; ARTHUR W. McALLISTER ADMINISTRATOR OF SAID LEVI K. WILLIAMS, DECEASED.

PATTERN-TABLE FOR SHEET-METAL-SHEARING MACHINES.

SPECIFICATION forming part of Letters Patent No. 488,344, dated December 20, 1892.

Application filed April 14, 1892. Serial No. 429,101. (No model.)

*To all whom it may concern:*

Be it known that we, CHARLES A. WILLIAMS and LEVI K. WILLIAMS, citizens of the United States of America, residing at Chicago, in the county of Cook and State of Illinois, have invented certain new and useful Improvements in Pattern-Tables for Sheet-Metal-Shearing Machines, of which the following is a specification, reference being had therein to the accompanying drawings and the letters of reference thereon, forming a part of this specification, in which—

Figure 1 is a top plan view of the pattern table detached from the machine. Fig. 2 is a similar view of said table on a reduced scale, and shown as attached to a sheet metal shearing machine, having rotary cutters, and a clamp attached to a radial arm for drawing the tin to be cut through the machine, and Fig. 3, is a section of said table shown as supported on the bed of the machine.

This invention relates to certain improvements in machines for shearing sheet metal, and more particularly to the pattern table, having scales therein operating as a guide to determine the position in which to secure a gage against which to place a sheet of metal to cause it to be cut in the shape desired, for the flared side of a vessel, and this invention is intended to be an improvement on the pattern table for which Letters Patent of the United States, No. 215,780 dated May 27, 1879 were granted to these applicants.

Referring to the drawings, and more particularly to Fig. 1, A represents the pattern table consisting of a rectangular metal plate having the slots $a$, $c$ and $r$ for receiving the thumb bolts V for receiving a gage G to the face of the table.

B, is a circular scale arranged centrally on the table, the lines and figures being cut in the table (as are all the scales shown.) D and F are two parallel scales arranged across the table within said circular scale and H. J are scales arranged parallel with each other and at each side of the circular scales respectively, and K is a similar scale arranged across the table at right angles with scales H. J, and at what may be termed the front side of the circular scale as the side next said scale K is intended to be placed next the machine to which it may be attached. The figures on the scale indicate at what place to set the gage G to cut the sides of any particular vessel.

It is intended to have in a shop a printed table wherein the name of the piece of metal is to be kept, and figures denoting the place to set the gage G on said table: Thus—looking at Fig. 2 supposing the segmental piece of tin to be cut, and shown in broken lines, represented in the sides of a quart measure; the gage is set so its face next the tin will have its line fall over the figures or part of scale designated in said printed table as the place to set it for cutting the sides of a quart measure, and to cut any other form said gage would be set at the place designated in said printed table for each other form.

In Fig. 2 the table A is shown as being attached to the bed E, of a sheet metal cutting machine P having rotary cutters W and W′ between which the sheet of tin to be cut is drawn by means of grasping it with a clamp secured to the outer end of a radial arm L, the rear end of said arm being pivoted to the top of post N which is the center of the circle in which the tin is cut. It is designed to have the cutters movable so as to cut the tin to any desired depth. R is a spring roller used to hold the tin down on the table while being cut. The said table A is designed to be used with any sheet metal cutting machine in which the sheet can be drawn in a circular direction between rotating cutters so that in this case the machine is only shown for the purpose of illustrating the use of said table and not because it forms any part of this invention.

It is quite unimportant what length or number of inches or fractions of an inch are denoted on the scales, as the gage can be set as well whether the table is large or small, and the number of inches great or small on the scales. but it is desirable to have the scale divided into inches and fractions of an inch down to very small fractions as the smaller the fractions, the more accurately the gage can be set.

The side and front scales H, J, K and scales D, F are intended to be used in connection with the circular scale when the form of the sheet to be cut renders it inconvenient or impossible to set the gage so that the circular scale will do for both its ends, but however if desired all but the circular scale can be omitted for ordinary work. By the use of these scales it becomes unnecessary to have the table top marked with pattern lines, as shown in said Letters Patent referred to, and it becomes necessary to keep on hand a supply of separate patterns for each vessel, and the machine can do more accurate work than where patterns are used.

Having thus described our invention what we claim as new and desire to secure by Letters Patent is as follows to wit:—

In a sheet metal shearing machine the table A having the central circular scale B, the parallel scales D and F arranged within said circular scale, the parallel scales H and J arranged one at either side of said circular scale, the scale K arranged between and at right angles with scales H and J and at one side of circular scale B, the curved slot $a$ arranged to cross said circular scale, slots $r$, $c$ arranged at the side of said circular scale, the gage G, and the thumb nuts and screws V for adjustably securing said gage to the table, all arranged to operate substantially as and for the purpose set forth.

CHARLES A. WILLIAMS.
LEVI K. WILLIAMS.

Witnesses:
H. M. BRADY,
B. F. RAY.